(12) United States Patent
Anderson et al.

(10) Patent No.: US 12,222,250 B2
(45) Date of Patent: Feb. 11, 2025

(54) METHODS AND APPARATUS TO CONTROL HEATING BASED ON MONITORING FEEDBACK OF TEMPERATURE SENSORS

(71) Applicant: Illinois Tool Works Inc., Glenview, IL (US)

(72) Inventors: Dylan Anderson, Princeton, WI (US); Jeremy Overesch, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 568 days.

(21) Appl. No.: 16/668,923

(22) Filed: Oct. 30, 2019

(65) Prior Publication Data

US 2021/0131880 A1    May 6, 2021

(51) Int. Cl.
*G01K 15/00*    (2006.01)
*G01K 7/026*    (2021.01)

(52) U.S. Cl.
CPC ........... *G01K 15/007* (2013.01); *G01K 7/026* (2013.01)

(58) Field of Classification Search
CPC ...... G01K 15/007; G01K 3/005; G01K 7/026; G05D 23/1919
See application file for complete search history.

(56) References Cited

U.S. PATENT DOCUMENTS

| | | | |
|---|---|---|---|
| 4,788,398 A | 11/1988 | Hornung | |
| 5,711,606 A * | 1/1998 | Koether | G05D 23/1917 374/102 |
| 5,712,467 A * | 1/1998 | Straka | D02J 13/005 219/481 |
| 6,142,666 A * | 11/2000 | Koether | G05D 23/1917 374/149 |
| 2014/0053381 A1* | 2/2014 | Boetsch | D02G 1/125 28/249 |
| 2014/0076884 A1 | 3/2014 | Boulos | |
| 2016/0356193 A1* | 12/2016 | Rodatz | F01N 11/002 |
| 2019/0284784 A1* | 9/2019 | Darlington | G07C 3/08 |
| 2020/0187304 A1* | 6/2020 | Yamada | G05D 23/19 |
| 2021/0031426 A1* | 2/2021 | Maruyama | B29C 45/77 |

OTHER PUBLICATIONS

1 European Office Communication with search report Appln No. 20203371.8 dated Jan. 14, 2021.

* cited by examiner

*Primary Examiner* — Kyle R Quigley
(74) *Attorney, Agent, or Firm* — McAndrews, Held & Malloy, Ltd.

(57) ABSTRACT

Methods and apparatus to control heating based on monitoring feedback of temperature sensors are disclosed. An example heating apparatus includes: a heater configured to apply heat energy to an object; and control circuitry configured to: control the heater based on a target temperature to which the object is to be heated; in response to determining that a first measured temperature sample associated with a first temperature sensor is greater than a first reference temperature, updating a first temperature range and the first reference temperature based on the first measured temperature sample; and in response to determining that a second measured temperature sample associated with the first temperature sensor is not within the first temperature range, reduce the priority of the first temperature sensor for control of applying the heat energy to the object.

20 Claims, 6 Drawing Sheets

METHODS AND APPARATUS TO CONTROL HEATING BASED ON MONITORING FEEDBACK OF TEMPERATURE SENSORS

BACKGROUND

This disclosure relates generally to heating and, more particularly, to methods and apparatus to control heating based on monitoring feedback of temperature sensors.

SUMMARY

Methods and apparatus to control heating based on monitoring feedback of temperature sensors are disclosed, substantially as illustrated by and described in connection with at least one of the figures, as set forth more completely in the claims.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1A:
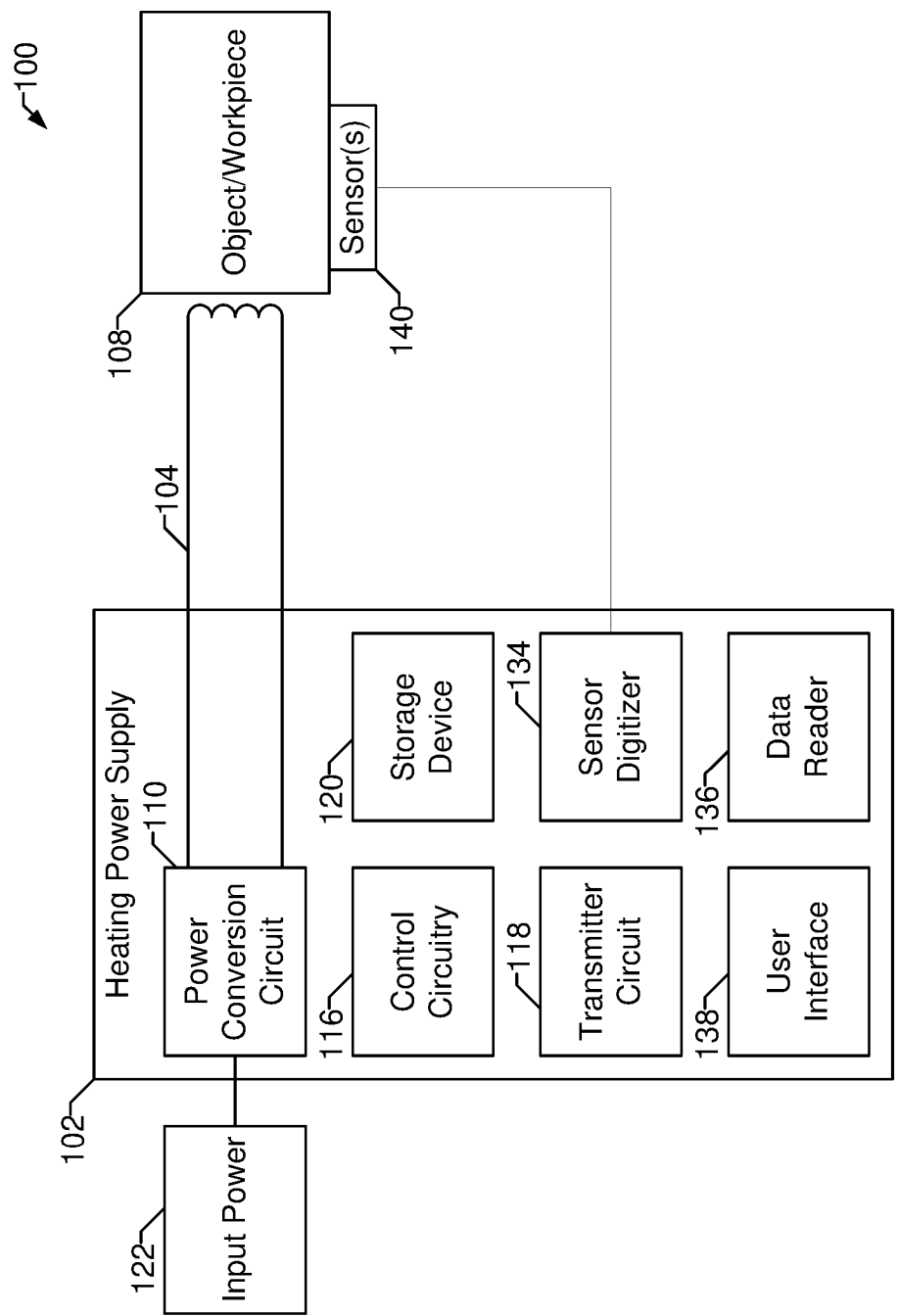
FIG. 1A shows an example heating system configured to control a temperature of an object to be heated based on one or more temperature sensors, in accordance with aspects of this disclosure.

Conventional heating systems may include algorithms to detect conditions in which a thermocouple fails or is detached from the heating control system, such that a signal is no longer received from the thermocouple. However, conventional heating systems are unable to detect when a thermocouple or other temperature sensor has become thermally decoupled from the object to be heated but continues to provide feedback. As a result, conventional heating systems can potentially overheat and damage the object and/or damage the heater.

Disclosed methods and apparatus provide thermostatically controlled heating systems that heat a workpiece or object to a target temperature, such as heating for a specified duration and/or at a specified rate. Disclosed example methods and apparatus involve applying heat energy to the object, regulating the energy delivery based on temperature feedback from a temperature feedback device (e.g., sensor) that is thermally coupled or bonded to the object, and monitoring for thermal decoupling of the temperature feedback device. Disclosed example methods and apparatus take action to stop or modify the heating process, notify a user, and/or take another action in response to detecting a thermal decoupling of the temperature feedback device.

As used herein, the term "induction heating power" refers to AC electrical power capable of inducing a current in a workpiece when flowing through an appropriately arranged cable so as to heat the workpiece by magnetic induction.

As used herein, the terms "first," "second," "third," etc., are used to enumerate instances of similar or identical elements, and do not indicate or imply order unless an order is specifically identified.

As used herein, a "circuit" includes any analog and/or digital components, power and/or control elements, such as a microprocessor, digital signal processor (DSP), software, and the like, discrete and/or integrated components, or portions and/or combinations thereof. The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a heating process, a device such as a power source, and/or any other type of heating-related system.

As used herein, the term "memory" includes volatile and non-volatile memory devices and/or other storage device.

As used herein, a "blanket" refers to an insulative layer covering the induction heating cables and which protect the cables. As used herein, the term "identifier" may include a serial number, a model number, or any other identification value, and which may be expressed as a quick read (QR) code, a bar code, a human readable number, a radio frequency identification (RFID) tag, and/or any other machine readable indicia.

While the examples disclosed below are discussed with reference to an induction heating system, the examples may be modified to use other types of heating. Furthermore, the term "heating" includes both heating to increase the temperature of an object and applying heat energy to reduce a rate of convective and/or radiated cooling occurring in an object.

Disclosed example heating apparatus include a heater configured to apply heat energy to an object and control circuitry. The control circuitry is configured to: control the heater based on a target temperature to which the object is to be heated; in response to determining that a first measured temperature sample associated with a first temperature sensor is greater than a first reference temperature, update a first temperature range and the first reference temperature based on the first measured temperature sample; and, in response to determining that a second measured temperature sample associated with the first temperature sensor is not within the first temperature range, reduce the priority of the first temperature sensor for control of applying the heat energy to the object.

In some example heating apparatus, the control circuitry is configured to repeatedly update the first temperature range in response to additional measured temperature samples being greater than the first reference temperature at the time of the respective measured temperature sample. In some examples, the control circuitry is configured to compare the additional measured temperature samples to the first temperature range, and reduce the priority of the first temperature sensor for control of applying the heat energy to the object in response to any of the additional measured temperature samples being outside of the first temperature range as of the comparison.

In some examples, the control circuitry is configured to not update the first temperature range in response to determining that the first measured temperature sample is not greater than the first reference temperature. In some example heating apparatus, the heater includes power conversion circuitry configured to convert input electrical power to induction heating power or resistive heating power. Some example heating apparatus further includes a sensor monitoring circuit configured to receive the first measured temperature sample and the second measured temperature sample, in which the first temperature sensor includes at least one of a thermocouple, an infrared temperature sensor, or a resistance temperature detector.

In some examples, the control circuitry is configured to update the first temperature range by setting at least one of an upper temperature limit or a lower temperature limit based on the first measured temperature sample. In some examples, the control circuitry is configured to: reset and initialize a timeout counter in response to a start of applying the heat energy to the object; in response to determining that the first measured temperature sample associated with a first temperature sensor has increased at least a threshold amount above a reference temperature, reset the timeout counter based on the first measured temperature sample; and in response to the timeout counter reaching a threshold count, reduce the priority of the first temperature sensor for control of applying the heat energy to the object.

In some examples, the control circuitry is configured to determine the threshold count based on at least one of an identifier of the object, a size of the object, or a material of the object. In some examples, the control circuitry is configured to increment the timeout counter in response to receiving measured temperature samples. In some example heating apparatus, the timeout counter is configured to increment based on a clock. In some examples, the control circuitry is configured to reduce the priority of the first temperature sensor by controlling the applying of the heat energy to maintain the temperature of the object or by stopping the applying of heat energy to the object.

In some examples, the control circuitry is configured to: in response to determining that a third measured temperature sample associated with a second temperature sensor is greater than a second reference temperature, updating a second temperature range and the second reference temperature based on the third measured temperature sample; determine whether control of the heater is based on samples associated with the second temperature sensor; when the control of the heater is based on the samples associated with the second temperature sensor, reduce the priority of the second temperature sensor for control of applying the heat energy to the object in response to determining that a third measured temperature sample associated with the second temperature sensor is not within the second temperature range.

In some examples, the control circuitry is configured to, when control of the heater is based on the samples associated with the first temperature sensor, continue control of the heater based on the first temperature sensor in response to determining that the third measured temperature sample associated with the second temperature sensor is not within the second temperature range. In some example heating apparatus, the control circuitry is configured to reduce the priority of the first temperature sensor for control of applying the heat energy to the object to less than a priority of a second temperature sensor for control of applying the heat energy to the object.

Some disclosed example heating apparatus includes a heater configured to apply heat energy to an object and control circuitry configured to: control the heater based on a target temperature to which the object is to be heated; reset and initialize a timeout counter in response to a start of applying the heat energy to the object; in response to determining that a first measured temperature sample associated with a first temperature sensor has increased at least a threshold amount above a reference temperature, reset the timeout counter and update the reference temperature based on the subsequent measured temperature sample; and in response to the timeout counter reaching a threshold count, reduce the priority of the first temperature sensor for control of applying the heat energy to the object.

In some examples, the control circuitry is configured to determine the threshold count based on at least one of an identifier of the object, a size of the object, or a material of the object. In some examples, the control circuitry is configured to increment the timeout counter in response to receiving measured temperature samples. In some example heating apparatus, the timeout counter is configured to increment based on a clock. In some examples, the control circuitry is configured to turn off or ignore the timeout counter in response to a second measured temperature sample satisfying a threshold temperature.

In some example heating apparatus, the control circuitry is configured to output a notification that the first temperature sensor is not properly coupled to the object when the timeout counter reaches the threshold count. In some examples, the control circuitry is configured to set the reference temperature based on at least one of an initial measured temperature or the first measured temperature sample.

FIG. 1A shows an example heating system 100 configured to control a temperature of an object 108 to be heated based on one or more temperature sensors. The example heating system 100 of FIG. 1 includes an induction heating power supply 102 and an induction heating cable 104. The induction heating power supply 102 heats an object 108 by transmitting induction heating power to the object 108 via the induction heating cable 104, which is arranged proximate the object 108 to induce current in the object 108 via magnetic induction from the current in the induction heating cable 104.

The induction heating power supply 102 supplies induction heating power to the object 108. The induction heating power supply 102 includes a power conversion circuit 110, a control circuitry 116, a transmitter circuit 118, a storage device 120, a sensor digitizer 134, a data reader 136, and a user interface 138. The induction heating power supply 102 is coupled to one or more temperature sensors 140 configured to measure a temperature of the object 108 at one or more points on the object 108. The example sensor(s) 140 may include a thermocouple, an infrared temperature sensor, a resistance temperature detector, and/or any other type of temperature sensor.

The example power conversion circuit 110 converts input power 122 into induction heating power and transmits the induction heating power via the induction heating cable 104. For example, the power conversion circuit 110 may receive utility power and/or generator power, convert the input power 122 to a frequency suitable for heating the particular type of object 108, and transmit the power via the induction heating cable 104. The induction heating cable 104 includes one or more conductors for conducting current, which can be arranged proximate a workpiece to heat the workpiece by induction.

The control circuitry 116 may control the power conversion circuit 110 based on the data to, for example, increase and/or decrease the induction heating power output, stop and/or start the induction heating power output, modify the frequency of the induction heating power output, and/or perform any other control or modification.

Temperature data may be generated from sensor data collected by the one or more sensors 140 and converted to digital data via the sensor digitizer 134 or other sensor monitoring circuit. The example data reader 136 may be a e.g., RFID reader, barcode scanner, QR code scanner, and/or any other type of data reader 136. The example user interface 138 may include any type(s) of user interface devices, such as selection buttons, switches, dials, number pads, touchscreens, and/or any other type of user interface device.

The control circuitry 116 controls the power conversion circuit 110 to modify the induction heating power based on data received from the sensor(s) 140 via the sensor digitizer 134. For example, the data may include a measured temperature sample of the object 108.

The transmitter circuit 118 transmits some or all of the received data to, for example, a local or remote storage device, a local or remote server, and/or any other device. An example recipient of the transmission of the data may be, for example, a computer or a server configured with Insight(R) software sold by Miller Electric(R). Additionally or alternatively, the storage device 120 stores the received data for later retrieval and/or transmission by the transmitter circuit 118. The example transmitter circuit 118 may include a wireless communications transmitter (e.g., cellular, Long Term Evolution (LTE), WiFi, Bluetooth(R), etc.) and/or a wired communications transmitter (e.g., Ethernet, CAN, USB etc.). The example storage device 120 may be an integrated storage device such as a hard drive, solid state storage, or memory device, or a removable storage device such as a USB drive or other connected storage.

Figure 1B:
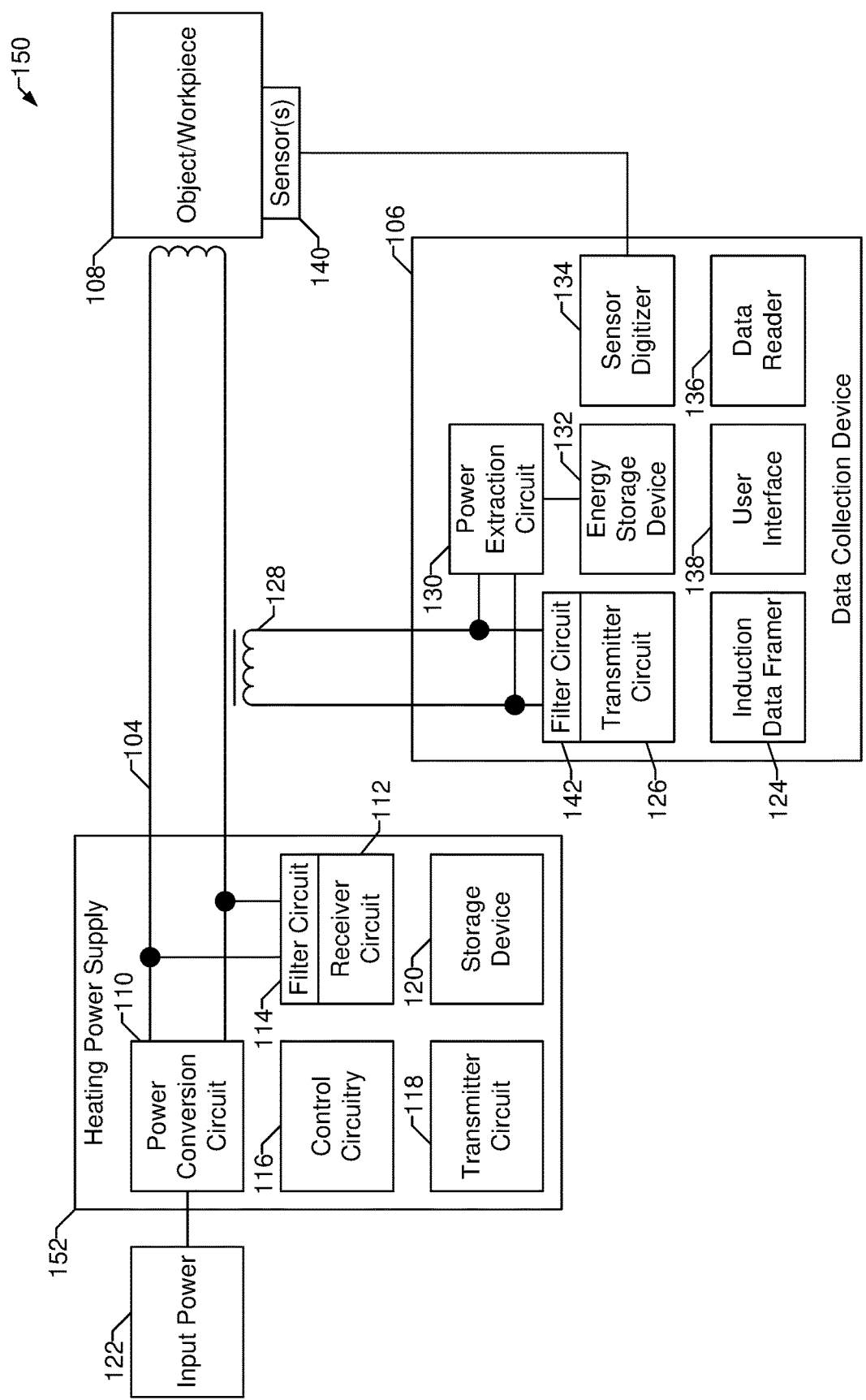
FIG. 1B shows an example heating system configured to control a temperature of an object to be heated based on one or more temperature sensors, in accordance with aspects of this disclosure.

FIG. 1B is a block diagram of another example heating system 150 that includes a heating power supply 152 and a data collection device 106. The example heating power supply 152 includes the power conversion circuit 110, the control circuitry 116, the transmitter circuit 118, and/or the storage device 120 as described above. The example data collection device 106 includes an induction data framer 124, a transmitter circuit 126, a power extraction circuit 130, an energy storage device 132, and a filter circuit 142. The example data collection device 106 further includes the sensor digitizer 134, the data reader 136, the user interface 138 and/or of FIG. 1A. In contrast with the example system 100 of FIG. 1A, the heating system 150 obtains data from the sensor(s) 140 at a location remote from the heating power supply 152 and transmits the data to the heating power supply 152 for control of heating.

The receiver circuit 112 is coupled to the induction heating cable 104 and configured to receive data via the induction heating cable 104. As disclosed in more detail below, the power conversion circuit 110 outputs the induction heating power at a first frequency and the receiver circuit 112 receives the data at a second frequency different than the first frequency. To separate the data from the induction heating power, the induction heating power supply 152 includes a filter circuit 114 that attenuates the induction heating power. The filter circuit 114 may be a high pass filter and/or a bandpass filter for data signals that are substantially higher than the induction heating power frequency. The filter circuit 114 may be a low pass filter for data signals that are substantially lower that the induction heating power frequency.

While the example filter circuit 114 is shown as directly coupled to the induction heating cable 104 in parallel with the object 108, in other examples the filter circuit 114 is directly coupled in series with the induction heating cable 104, inductively coupled to the induction heating cable 104, wirelessly coupled to the induction heating cable 104, and/or directly connected to the induction heating cable 104.

The example transmitter circuit 126 and the example receiver circuit 112 may communicate using any appropriate modulation scheme. By way of example, the transmitter circuit 126 and the example receiver circuit 112 may communicate using Orthogonal Frequency Division Multiplexing (OFDM), Quadrature Amplitude Modulation (QAM), Frequency Shift Keying, and/or any other analog, digital, and/or spread spectrum modulation schemes, and/or any combination of modulation schemes. Example techniques that may be implemented by the transmitter circuit 126 and/or the receiver circuit 112 are described by Yonge et al., "An Overview of the HomePlug AV2 Technology," Journal of Electrical and Computer Engineering, Volume 2013, the entirety of which is incorporated herein by reference. However, other techniques may be used by either the transmitter circuit 126 or the receiver circuit 112.

The example transmitter circuit 126 transmits the induction heating data via an AC signal, using a frequency different than an induction heating current frequency, on the induction heating cable 104 (e.g., output by the induction heating power supply 102). The example transmitter circuit 126 is coupled to the induction heating cable 104 via the coupling circuit 128 and a filter circuit 142. The filter circuit 142 enables the frequency transmitted by the transmitter circuit 126 to be output to the coupling circuit 128 while attenuating the frequencies of the induction heating power. The example coupling circuit 128 of FIG. 1B includes a current transformer magnetically coupled to the induction heating cable 104.

The power extraction circuit 130 extracts power from the induction heating cable 104 via the coupling circuit 128 to power the transmitter circuit 126, the induction data framer 124, the sensor digitizer 134, the data reader 136, and/or the user interface 138, and/or to charge the energy storage device 132. The example energy storage device 132 provides power to the transmitter circuit 126, the induction data framer 124, the sensor digitizer 134, the data reader 136, and/or the user interface 138 when the power extraction circuit 130 is not capable of powering the components. The example energy storage device 132 may include one or more batteries, one or more capacitors, and/or any other type of energy storage device.

In some examples, the data collection device 106 can be powered by the induction heating power supply 152 to enable the data collection device 106 to collect and/or send data while induction heating power is not being applied to the induction heating cable 104. The power conversion circuit 110 may output a pulse via the induction heating cable 104 to power the data collection device 106. After outputting the pulse, the power conversion circuit 110 turns off the power and the receiver circuit 112 receives data transmitted from the data collection device via the induction heating cable 104 in response to the pulse.

In some examples, the induction heating power supply 152 provides intermittent power to heat the object 108 and, while not providing power, receives the data at the receiver circuit 112. In some such examples, communication only occurs when the induction heating power supply 152 is not outputting induction heating power, and the control circuitry 116 implements logic to connect or enable the receiver circuit 112 to receive communications when the power supply 152 is not providing heating power. For example, the power conversion circuit 110 outputs the induction heating power via the induction heating cable 104 for a first time period, reduces or removes the induction heating power for a second time period following the first time period, outputs the induction heating power again during a third time period following the second time period, and so on. The receiver circuit 112 receives the data during the second time period. In some examples, instead of or in addition to including the filter circuit 114 to couple the receiver circuit 112 to the induction heating cable 104, the induction heating power supply 152 includes a relay, a contactor, or another type of isolation device to selectively connect and disconnect the receiver circuit 112 from the induction heating cable 104. The control circuitry 116 coordinates the power conversion circuit 110 and the isolation device to connect the receiver circuit 112 when the power conversion circuit 110 is not outputting the induction heating power and to disconnect the receiver circuit 112 when the power conversion circuit 110 is outputting the induction heating power.

Conversely, the example heating power supply 152 may be configured to enable and/or connect the receiver circuit 112 to receive the data when the induction heating power supply 152 is outputting induction heating power, and the control circuitry 116 implements logic to disconnect and/or disable the receiver circuit 112 when the power supply 152 is not providing heating power.

Instead of a coupling circuit 128, in some examples the data collection device 106 is coupled to the induction heating cable 104 via cable taps to couple the transmitter circuit 126 in parallel with an inductance of the object 108 being heated by the induction heating cable 104.

In an example of operation of the system 150 of FIG. 1B, the control circuitry 116 enables the power conversion circuit 110 to output the induction heating power via the induction heating cable 104 at a first frequency to heat the object 108. As the induction heating power is flowing through the induction heating cable 104, the example power extraction circuit 130 extracts a portion of the induction heating power to power the induction data framer 124, the transmitter circuit 126, the sensor digitizer 134, the data reader 136, and/or the user interface 138, and/or to power the energy storage device 132. The sensor digitizer 134 digitizes signals received from the sensor(s) 140 (e.g., a voltage signal from a thermocouple measuring the temperature of the object 108 as the object 108 is heated) and provides the signals to the transmitter circuit 126. The transmitter circuit 126 transmits the data from the sensor digitizer 134 at a frequency different than the frequency of the induction heating power. For example, the transmitter circuit 126 may transmit the data at a frequency several orders of magnitude higher than the frequency of the induction heating power. The filter circuit 114 permits the transmitted data to be received at the receiver circuit 112, which reads the data from the induction heating cable 104. The receiver circuit 112 may store the data in the storage device 120, provide the data to the transmitter circuit 126 for transmission to a data collection server (or other device), and/or provide the data to the control circuitry 116 for controlling the induction heating.

In some examples, the data collection device 106 of FIG. 1B can be powered by the induction heating power supply 152 to enable the data collection device 106 to collect and/or send data while induction heating power is not being applied to the induction heating cable 104. The power conversion circuit 110 may output a pulse via the induction heating cable 104 to power the data collection device 106. After outputting the pulse, the power conversion circuit 110 turns off the power and the receiver circuit 112 receives data transmitted from the data collection device via the induction heating cable 104 in response to the pulse.

In some examples, the heating power supply 152 is also capable of transmitting data via the induction heating cable 104 to the data collection device 106 (e.g., bidirectional communication between the heating power supply 152 and the data collection device 106). In addition to the example data transmitted by the data collection device to the heating power supply 152 via the induction heating cable 104, the heating power supply 152 may transmit data, such as control or configuration data, to the data collection device 106 for implementation by a control circuit at the data collection device 106. Additionally or alternatively, the heating power supply 152 may transmit handshake information for use in negotiating the connection with the data collection device 106.

During a heating process, the control circuitry 116 of the power supply 102 or 152 monitors the temperature samples from the sensor(s) 140 (e.g., received via the sensor digitizer 134 or the data collection device 106) to control the heating process. For example, the sensor(s) 140 may provide temperature feedback to enable the control circuitry 116 to control heating of the object to a target temperature. However, if a temperature-dependent control loop does not receive accurate temperature feedback, such as when the temperature sensor(s) 140 become thermally decoupled or detached from the object 108, then the control loop may continue to apply heat energy to the object 108 as the temperature of the object 108 reaches and exceeds the target temperature.

To reduce or prevent the likelihood of overheating the object 108, the control circuitry 116 also determines whether the sensor(s) 140 have been decoupled from the object 108, as explained in more detail below. If a sensor 140 is identified as decoupled from the object 108, the control circuitry 116 reduces the priority of the decoupled sensor for control of the heating process. For example, the control circuitry 116 may change to using a different sensor if multiple sensors are used or, if the decoupled sensor is not being relied on for feedback, the control circuitry 116 may continue the heating process without changes. In some examples in which multiple sensors, including the decoupled sensor, are used simultaneously, the control circuitry 116 may reduce a relative weight of the decoupled sensor, demote the decoupled sensor from being a primary sensor to a non-primary sensor, stop using the decoupled sensor altogether, and/or otherwise reduce the priority and/or reliance of the heating process control on the decoupled sensor. If the sensor 140 needed for temperature feedback for a given heating process is determined by the control circuitry 116 to be decoupled from the object 108, the control circuitry 116 may output a notification or alert (e.g., via the user interface 138, via the transmitter circuit 118, etc.), and control the power conversion circuitry 110 to stop outputting heating energy and/or to lower the heating energy output to a level that will not overheat the object 108.

Some example ways in which the sensor(s) 140 may become decoupled from the object 108 include being physically removed from contact with the object 108, having a thermal coupling with the object 108 become weakened, or not being thermally coupled in the first place. Such decoupling may manifest by, for example, providing temperature feedback that is significantly less than the actual temperature of the object 108 and/or experiencing noise due to inconsistent thermal coupling.

To identify thermal decoupling of the sensor 140 from the object 108, the example control circuitry 116 updates a reference temperature and a temperature range associated with the sensor 140 as the temperature measured by the sensor 140 increases. The temperature range defines an upper temperature limit and/or a lower temperature limit based on the reference temperature. If a measured temperature sample from the sensor is outside of the temperature range, or if the reference temperature stops increasing for a time period prior to the object reaching the target temperature, the control circuitry 116 determines that the sensor 140 has been decoupled from the object 108 and reduces the priority assigned to that sensor 140 for control of the heating process.

Figure 2:
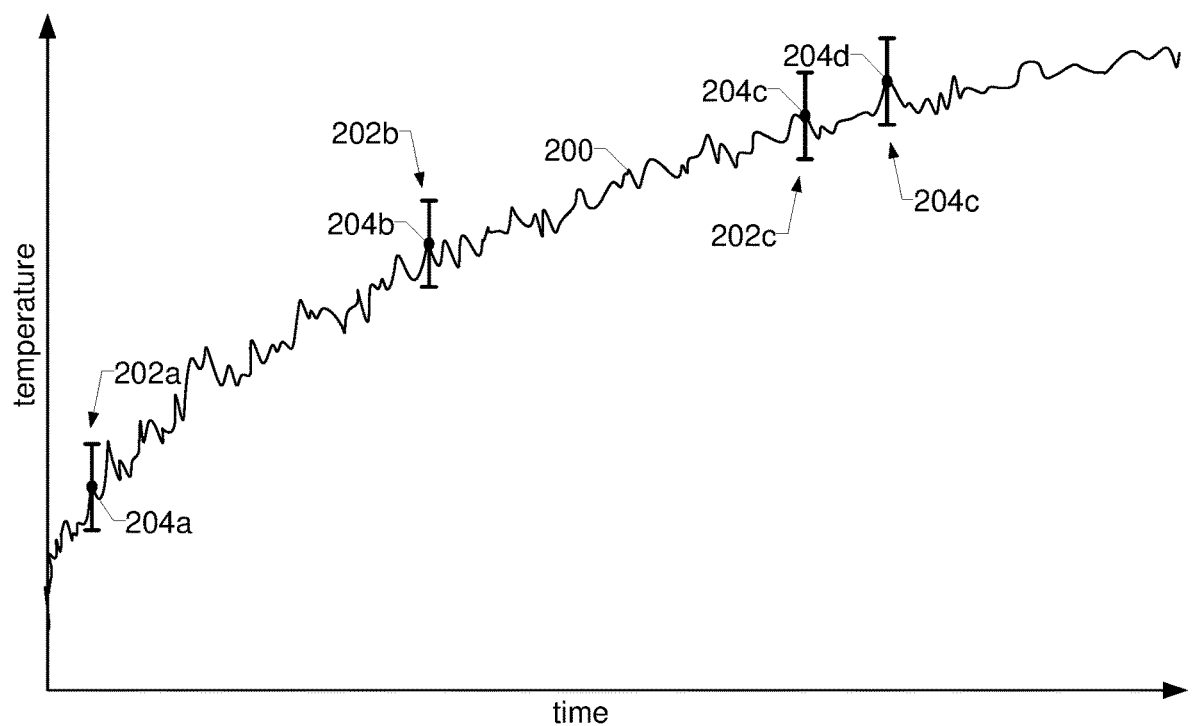
FIG. 2 illustrates measured temperature values during an example process that may be implemented by the heating systems of FIGS. 1A and 1B, as well as example temperature range(s) and reference temperature(s) associated with one or more temperature sensors during a heating process.

FIG. 2 illustrates measured temperature values 200 during an example process that may be implemented by the heating systems of FIGS. 1A and 1B, as well as example temperature range(s) 202a-202d and reference temperature(s) 204a-204d associated with one or more temperature sensors during a heating process.

As illustrated in FIG. 2, the temperature ranges 202a-202d define lower temperature limits and upper temperature limits around the corresponding reference temperatures 204a-204d. In some examples, the lower temperature limits and the upper temperature limits defining the temperature ranges 202a-202d are symmetric with respect to the reference temperatures 204a-204d (e.g., the lower temperature limit is X degrees below the reference temperature and the upper temperature limit is X degrees above the reference temperature). In some other examples, the temperature range may be defined asymmetrically with respect to the reference temperature (e.g., the lower limit and the upper limit may be separated from the reference temperature by different amounts).

As the temperatures measured by the sensor 140 increases, the example control circuitry 116 updates the reference temperature 204a-204d and the corresponding temperature range 202a-202d. In some examples, the reference temperature 204a-204d is updated each time a measured temperature sample is greater than the reference temperature by changing the reference temperature to the new measured temperature sample. Similarly, the temperature range may be updated each time the reference temperature 204a-204d is updated. Thus, while some example reference temperatures 204a-204d and the corresponding temperature ranges 202a-202d are illustrated, the example measured temperature values 200 of FIG. 2 may result in more updates than are illustrated.

In the example of FIGS. 1A, 1B, and 2, the temperature range 204a-204d and the reference temperature 202a-202d are not updated when a measured temperature sample is less than the reference temperature. If a measured temperature sample is outside of the current temperature range 202a-202d, or if the reference temperature is not updated before a timeout counter expires (e.g., reaches a predetermined count or time duration), the example control circuitry 116 determines that the sensor 140 corresponding to the measured temperature values 200 is decoupled from the object 108.

In some examples, the control circuitry 116 disables or ignores the timeout counter when the workpiece reaches the target temperature.

During the heating operation, when a measured temperature sample is below the lower temperature limit of the temperature range 202a-202d at the time of the measured temperature sample, the example control circuitry 116 may determine that the sensor 140 has become decoupled (e.g., pulled off) from the object 108. When a measured temperature sample exceeds the upper temperature limit of the temperature range 202a-202d at the time of the measured temperature sample, the example control circuitry 116 may determine that the sensor 140 is experiencing noise representative of a poor thermal coupling between the sensor 140 and the object 108.

In examples in which multiple temperature sensors 140 are used for temperature feedback (e.g., multiple thermocouples attached to different locations on the object 108), the control circuitry 116 maintains and updates separate reference temperatures and/or temperature ranges for each of the temperature sensors. The control circuitry 116 may update a first reference temperature and a first temperature range in response to receiving temperature samples from a first temperature sensor 140, update a second reference temperature and a second temperature range in response to receiving temperature samples from a second temperature sensor 140, update a third reference temperature and a third temperature range in response to receiving temperature samples from a third temperature sensor 140, and so on.

In some examples, the control circuitry 116 may maintain a single reference temperature for multiple temperature sensors 140 and/or a single temperature range for multiple temperature sensors 140. For example, the control circuitry 116 may update a single reference temperature and/or a single temperature range in response to a temperature sample from any of multiple temperature sensors being greater than the current reference temperature, such as by updating the reference temperature to equal the temperature sample and/or updating the single temperature range based on the temperature sample. Additionally or alternatively, the control circuitry 116 may compare temperature samples from any of the multiple temperature sensors 140 against a single temperature range (which may be updated based on only one, selected ones, or all of the temperature sensors). If a temperature sample from one of the multiple temperature sensor(s) 140 is outside of the range, the example control circuitry 116 may determine that the temperature sensor 140 from which the temperature sample was received is decoupled from the object 108.

Figure 3A:
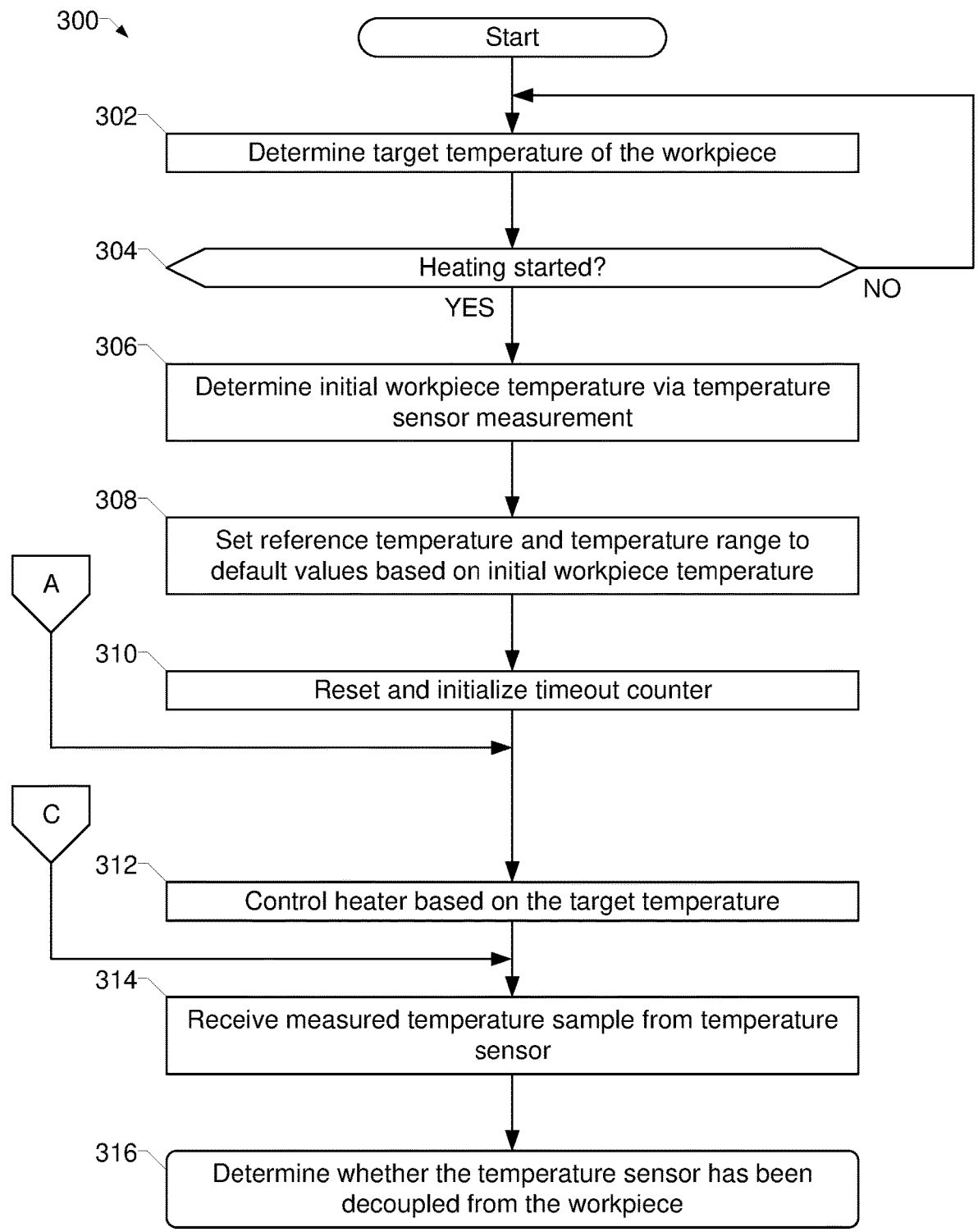
FIGS. 3A-3C illustrate a flowchart representative of example machine readable instructions which may be executed by the example induction heating power supplies of FIGS. 1A and/or 1B to control a temperature of an object to be heated based on one or more temperature sensors.
Figure 3B:
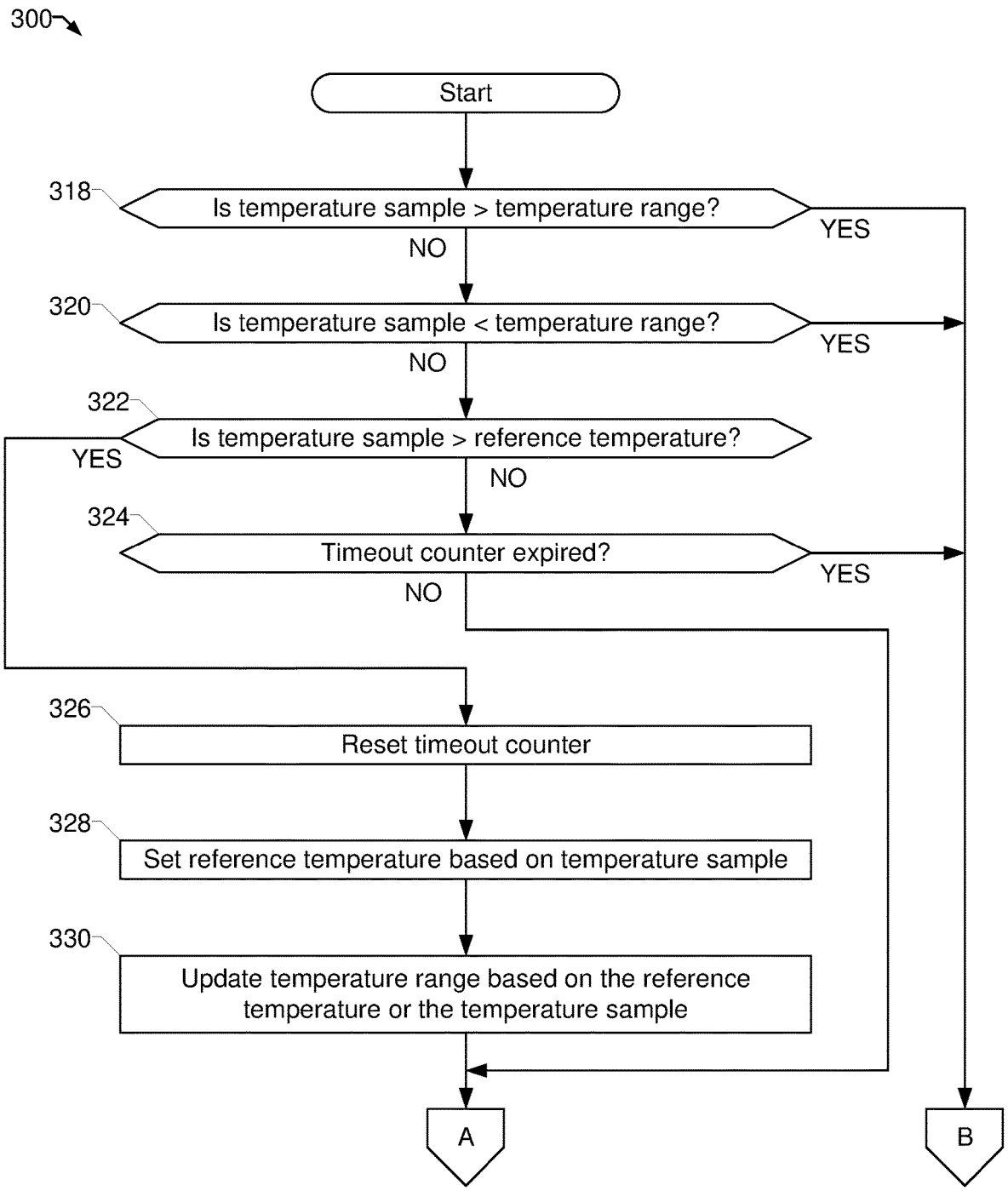
Figure 3C:
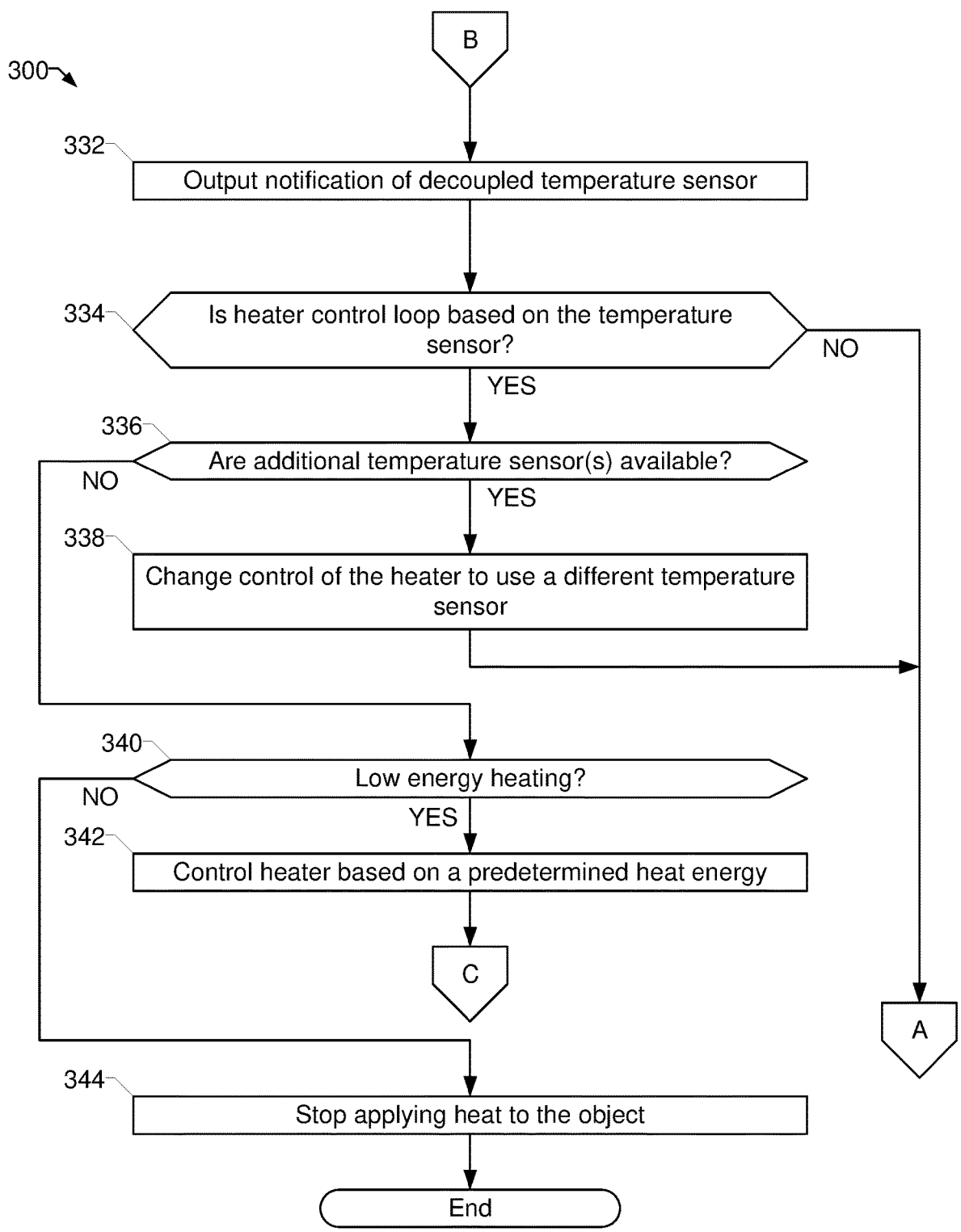

FIGS. 3A-3C illustrate a flowchart representative of example machine readable instructions 300 which may be executed by the example induction heating power supplies 102, 152 of FIGS. 1A and/or 1B to control a temperature of an object to be heated based on one or more temperature sensors. The example instructions 300 may be performed by the example control circuitry 116. In some examples, the control circuitry 116 may implement portions of the instructions 300 for multiple temperature sensors 140 in parallel to monitor each of multiple sensors for thermal decoupling.

At block 302, the control circuitry 116 determines a target temperature of the workpiece (e.g., the object 108). For example, the control circuitry 116 may receive a target temperature via the user interface 138 of FIGS. 1A or 1B. At block 304, the example control circuitry 116 determines whether heating has started. For example, the control circuitry 116 may determine whether an operator has initiated heating via the user interface 138. If heating has not started (block 304), control returns to block 302 to determine whether the target temperature has changed.

When heating has started (block 304), at block 306 the control circuitry 116 determines an initial workpiece temperature via a temperature sensor measurement. For example, the control circuitry 116 may receive an initial temperature measurement from the sensor 140. At block 308, the control circuitry 116 sets a reference temperature and a temperature range to default values based on the initial workpiece temperature. For example, the control circuitry 116 may set the reference temperature to equal the initial temperature measurement, and set the initial temperature range based on the reference temperature, such as +/−25 degrees with respect to the reference temperature. The initial temperature range may be set using other values.

At block 310, the control circuitry 116 resets and initializes a timeout counter. If the timeout counter reaches a threshold count, the control circuitry 116 determines that the sensor 140 corresponding to the counter has not increased within an acceptable time (e.g., the sensor 140 may not have been thermally coupled to the workpiece prior to beginning the heating process). An example reset value may be 0, or any other predetermined value. The timeout counter may be a clocked timer (e.g., a timer running based on a clock circuit or other substantially consistent timer, a counter incremented based on a clock, etc.), or a counter that is incremented based on a number of samples received.

At block 312, the control circuitry 116 controls the heater (e.g., the power conversion circuitry 110) based on the target temperature. For example, the control circuitry 116 may implement a temperature control loop to increase the temperature of the workpiece toward a target temperature and/or at a desired rate.

At block 314, the control circuitry 116 receives a measured temperature sample from the temperature sensor. For example, the control circuitry 116 may receive the temperature sample via the sensor digitizer 134. At block 316, the control circuitry 116 determines whether the temperature sensor 140 has been decoupled from the workpiece 108. For example, the control circuitry 116 may compare the measured temperature sample against the temperature range and/or determine whether a timeout has occurred. Example instructions to implement block 316 are disclosed in FIGS. 3B and 3C.

Turning to FIG. 3B, block 318 enters from block 316. The control circuitry 116 determines whether the temperature sample (the sample received at block 314) is greater than the temperature range (block 318) or less than the temperature range (block 320). If the temperature sample is not greater than nor less than the temperature range (block 318 or block 320), at block 322 the control circuitry 116 determines whether the temperature sample is greater than the reference temperature. If the temperature sample is not greater than the reference temperature (block 322), at block 324 the control circuitry 116 determines whether the timeout counter has expired.

If the temperature sample is within the temperature range (block 318 or block 320) and is greater than the reference temperature (block 324), at block 326 the control circuitry 116 resets the timeout counter. At block 328, the control circuitry 116 sets the reference temperature based on the temperature sample. In some examples, the control circuitry 116 sets the reference temperature to be equal to the measured temperature sample. At block 330, the control circuitry 116 updates the temperature range based on the reference temperature and/or the temperature sample. For example, the control circuitry 116 may set the temperature range to have temperature limits above and below the updated reference temperature. After updating the reference temperature and the temperature range (blocks 328 and 330), control returns to block 312 to continue controlling the heater.

If the temperature sample is outside of the temperature range (block 318 or 320), or if the timeout counter has expired (block 324), the example control circuitry 116 determines that the sensor 140 is thermally decoupled from the workpiece and performs a handling process. The handling process may include one or more of reducing a relative weight of the decoupled sensor, demoting the decoupled sensor from being a primary sensor to a non-primary sensor, stopping using the decoupled sensor altogether in favor of a different sensor, reduce heating to a low level, stop output of heating energy, and/or output a notification or alert regarding the decoupled sensor. An example handling process is disclosed in FIG. 3C.

At block 332, the control circuitry 116 outputs a notification that the temperature sensor 140 has been decoupled from the workpiece. For example, the control circuitry 116 may output a visible and/or audible alert via the user interface 138, transmit a notification to an external device via the transmitter circuit 118, and/or otherwise output a notification to the appropriate personnel or system.

At block 334, the control circuitry 116 determines whether the heater control loop is based on the temperature sensor 140. For example, when multiple temperature sensors are used for a heating process, the control circuitry 116 may implement the heater control loop that has the highest temperature sample as the most recent sample (e.g., to reduce the probability of heating the workpiece above the target temperature). If the heater control loop is based on the temperature sensor 140 (block 334), at block 336 the control circuitry 116 determines whether additional temperature sensor(s) are available. For example, the control circuitry 116 may determine whether there are other temperature sensors 140 from which temperature samples have been received during the heating process and that have not been determined to be decoupled from the workpiece.

If additional temperature sensor(s) are available (block 336), at block 338 the control circuitry 116 changes control of the heater to use a different temperature sensor 140. After changing control to use a different temperature sensor 140 (block 338), or if the heater control loop is based on a different temperature sensor 140 (block 334), control returns to block 312 of FIG. 3A to continue controlling the heating process.

If no additional temperature sensors are available (block 336), at block 340 the control circuitry 116 determines whether a low energy heating mode is to be used. For example, the control circuitry 116 may continue to output a low energy to reduce or prevent cooling of the workpiece. In some examples, the low energy level is selected based on characteristics of the workpiece, such as thickness of the workpiece, radius of the workpiece (e.g., for pipe joints), material of the workpiece, and/or any other characteristics. If the low energy heating mode is to be used (block 340), at block 342 the control circuitry 116 controls the heater (e.g., the power conversion circuitry 110) based on a predetermined heat energy. Control then returns to block 314 of FIG. 3A.

If the low energy heating mode is not used (block 340), at block 344 the control circuitry 116 stops applying heat to the object. For example, the control circuitry 116 may control the power conversion circuitry 110 to stop outputting the heat energy. The example instructions 300 may then end.

While the above examples are described with reference to induction heating, the examples may be modified to be used for resistive heating, in which a heating cable provides electrical power to a heating element (or serves as the heating element) which is heated via FR heating and thermally coupled to a workpiece to be heated. The examples described above may be modified to communicate via the resistive heating cable based on the application heating power and/or heating frequencies in the heating cable.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A heating apparatus, comprising:
a heater configured to apply heat energy to an object; and
control circuitry configured to:
control the heater based on a target temperature to which the object is to be heated;
in response to determining that a first measured temperature sample associated with a first temperature sensor is greater than a first reference temperature, update a first temperature range and the first reference temperature based on the first measured temperature sample;
repeatedly update the previously updated temperature range and the previously updated reference temperature in response to additional measured temperature samples being greater than the previously updated reference temperature at the time of the respective measured temperature sample; and
in response to determining that a second measured temperature sample associated with the first temperature sensor is not within the updated temperature range, reduce the priority of the first temperature sensor for control of applying the heat energy to the object.

2. The heating apparatus as defined in claim 1, wherein the control circuitry is configured to:
compare the additional measured temperature samples to the updated temperature range; and
reduce the priority of the first temperature sensor for control of applying the heat energy to the object in response to any of the additional measured temperature samples being outside of the updated temperature range as of the comparison.

3. The heating apparatus as defined in claim 1, wherein the control circuitry is configured to not update the previously updated temperature range in response to determining that the first measured temperature sample is not greater than the updated reference temperature.

4. The heating apparatus as defined in claim 1, wherein the heater comprises power conversion circuitry configured to convert input electrical power to induction heating power or resistive heating power.

5. The heating apparatus as defined in claim 1, further comprising a sensor monitoring circuit configured to receive the first measured temperature sample and the second measured temperature sample, the first temperature sensor comprising at least one of a thermocouple, an infrared temperature sensor, or a resistance temperature detector.

6. The heating apparatus as defined in claim 1, wherein the control circuitry is configured to update the first temperature range by setting at least one of an upper temperature limit or a lower temperature limit based on the first measured temperature sample.

7. The heating apparatus as defined in claim 1, wherein the control circuitry is configured to:
reset and initialize a timeout counter in response to a start of applying the heat energy to the object;
in response to determining that the first measured temperature sample associated with a first temperature sensor has increased at least a threshold amount above a reference temperature, reset the timeout counter based on the first measured temperature sample; and
in response to the timeout counter reaching a threshold count, reduce the priority of the first temperature sensor for control of applying the heat energy to the object.

8. The heating apparatus as defined in claim 7, wherein the control circuitry is configured to determine the threshold count based on at least one of an identifier of the object, a size of the object, or a material of the object.

9. The heating apparatus as defined in claim 7, wherein the control circuitry is configured to increment the timeout counter in response to receiving measured temperature samples.

10. The heating apparatus as defined in claim 7, wherein the timeout counter is configured to increment based on a clock.

11. The heating apparatus as defined in claim 1, wherein the control circuitry is configured to reduce the priority of the first temperature sensor by controlling the applying of the heat energy to maintain the temperature of the object or by stopping the applying of heat energy to the object.

12. The heating apparatus as defined in claim 1, wherein the control circuitry is configured to:
in response to determining that a third measured temperature sample associated with a second temperature sensor is greater than the updated reference temperature, updating the previously updated temperature range and the previously updated reference temperature based on the third measured temperature sample;
determine whether control of the heater is based on samples associated with the second temperature sensor; and
when the control of the heater is based on the samples associated with the second temperature sensor, reduce the priority of the second temperature sensor for control of applying the heat energy to the object in response to determining that a third measured temperature sample associated with the second temperature sensor is not within the updated temperature range.

13. The heating apparatus as defined in claim 12, wherein the control circuitry is configured to, when control of the heater is based on the samples associated with the first temperature sensor, continue control of the heater based on the first temperature sensor in response to determining that the third measured temperature sample associated with the second temperature sensor is not within the updated temperature range.

14. The heating apparatus as defined in claim 1, wherein the control circuitry is configured to reduce the priority of the first temperature sensor for control of applying the heat energy to the object to less than a priority of a second temperature sensor for control of applying the heat energy to the object.

15. A heating apparatus, comprising:
    a heater configured to apply heat energy to an object; and
    control circuitry configured to:
        control the heater based on a target temperature to which the object is to be heated;
        reset and initialize a timeout counter in response to a start of applying the heat energy to the object;
        in response to determining that a first measured temperature sample associated with a first temperature sensor has increased at least a threshold amount above a reference temperature, reset the timeout counter and increase the reference temperature based on the subsequent measured temperature sample;
        repeatedly increase the reference temperature in response to additional measured temperature samples being greater than a previously increased reference temperature at the time of the respective measured temperature sample; and
        in response to the timeout counter reaching a threshold count, reduce a priority of the first temperature sensor for control of applying the heat energy to the object.

16. The heating apparatus as defined in claim 15, wherein the control circuitry is configured to determine the threshold count based on at least one of an identifier of the object, a size of the object, or a material of the object.

17. The heating apparatus as defined in claim 15, wherein the control circuitry is configured to increment the timeout counter in response to receiving measured temperature samples.

18. The heating apparatus as defined in claim 15, wherein the timeout counter is configured to increment based on a clock.

19. The heating apparatus as defined in claim 15, wherein the control circuitry is configured to turn off or ignore the timeout counter in response to a second measured temperature sample satisfying a threshold temperature.

20. The heating apparatus as defined in claim 15, wherein the control circuitry is configured to output a notification that the first temperature sensor is not properly coupled to the object when the timeout counter reaches the threshold count.

* * * * *